United States Patent
Gratacos (10) Patent No.: US 8,553,491 B2
(45) Date of Patent: Oct. 8, 2013

(54) SEISMIC EXPLORATION PROCESS ENABLING THE SUPPRESSION OF GHOSTS DUE TO REFLECTIONS AT THE WATER SURFACE, AND PROCESS FOR PROCESSING SEISMIC DATA IN ORDER TO SUPPRESS THESE GHOSTS

(75) Inventor: Bruno Gratacos, Saint-Rémy-lès-Chevreuses (FR)

(73) Assignee: CGG Veritas Services SA, Massy Cedex (FR)

( * ) Notice: Subject to any disclaimer, the term of this patent is extended or adjusted under 35 U.S.C. 154(b) by 667 days.

(21) Appl. No.: 12/154,767

(22) Filed: May 27, 2008

(65) Prior Publication Data
US 2009/0016158 A1 Jan. 15, 2009

(51) Int. Cl.
*G01V 1/38* (2006.01)

(52) U.S. Cl.
USPC .......................................................... 367/24

(58) Field of Classification Search
USPC ............................................... 367/15, 20–24
See application file for complete search history.

(56) References Cited

U.S. PATENT DOCUMENTS

| | | | |
|---|---|---|---|
| 2,757,356 A | 7/1956 | Haggerty | |
| 3,689,874 A * | 9/1972 | Foster et al. | 367/46 |
| 6,028,817 A | 2/2000 | Ambs | |
| 6,493,636 B1 | 12/2002 | DeKok | |
| 6,590,831 B1 * | 7/2003 | Bennett et al. | 367/16 |
| 6,691,038 B2 | 2/2004 | Zajac | |
| 6,704,244 B1 | 3/2004 | Vaage | |
| 6,747,913 B2 * | 6/2004 | Fokkema et al. | 367/24 |
| 2005/0265122 A1 * | 12/2005 | Grion | 367/21 |
| 2006/0176775 A1 | 8/2006 | Toennessen | |
| 2006/0227659 A1 * | 10/2006 | Grion | 367/24 |
| 2006/0227660 A1 * | 10/2006 | Grion | 367/24 |
| 2006/0250890 A1 | 11/2006 | van den Berg et al. | |
| 2007/0189117 A1 * | 8/2007 | Robertsson et al. | 367/24 |

FOREIGN PATENT DOCUMENTS

| | | |
|---|---|---|
| FR | 2773618 | 7/1999 |
| FR | 2874270 | 2/2006 |

OTHER PUBLICATIONS

Moan, Torgeir, "Dynamic Loading and Design of Structures", Wave Loading, pp. 179-183.
Hill, et al., "Over/Under Acquisition and Data Processing: The Next Quantum Leap in Seismic Technology", First Break, vol. 24, Jun. 2006, pp. 81-95.

* cited by examiner

*Primary Examiner* — Krystine Breier
(74) *Attorney, Agent, or Firm* — Patent Portfolio Builders, PLLC (57) ABSTRACT

The invention relates to a process for marine seismic exploration at least two different depths by means of streamers, each including a set of hydrophones, the acquisition of data at the different depths being performed in a single exploration region, and in which the position of the streamers and the hydrophones when acquiring seismic data at a first depth is independent of the position of the streamers and hydrophones when acquiring seismic data at a second depth.

15 Claims, 5 Drawing Sheets

SEISMIC EXPLORATION PROCESS ENABLING THE SUPPRESSION OF GHOSTS DUE TO REFLECTIONS AT THE WATER SURFACE, AND PROCESS FOR PROCESSING SEISMIC DATA IN ORDER TO SUPPRESS THESE GHOSTS

CROSS-REFERENCE TO RELATED APPLICATION

This application claims priority to French Application No. 0755279 filed May 25, 2007 entitled "Seismic Exploration Process Enabling the Suppression of Ghosts Due to Reflections at the Water Surface, and Process for Processing Seismic Data in Order to Suppress These Ghosts".

This invention relates to marine seismic exploration.

It relates in particular to a process for marine seismic exploration enabling the suppression of "ghosts" and a process for processing seismic data in order to suppress ghosts.

A "ghost" is an undesirable signal component due to reflections at the water surface.

PRIOR ART

A widely known oil or gas exploration technique consists of conducting seismic prospecting of the underground. To image the structure of the underground, the geophysicist uses "reflection seismics" techniques.

In marine seismics, the technique consists of towing behind a vessel:
  one or more energy sources for transmitting an acoustic wave, and
  seismic receivers arranged on streamers for recording the acoustic waves reflected by the interfaces between geological layers.

The source imparts an acoustic wave into the water. The compression waves created are coherently propagated downward (downgoing propagation). When the wave field reaches an interface between terrestrial formations, called a reflector, it is reflected through the formations and water to the seismic receivers (upgoing propagation), where it is converted into electrical signals and recorded.

The seismic receivers are arranged in a sufficient number for the recorded signals, called input traces, to constitute seismic data and enable the configuration of the geological layers to be imaged.

A problem encountered is that of reverberation, and can be explained as follows. A seismic wave reflected by a reflector travels through the water in a generally ascending direction. This wave, which is called the "primary", is propagated through the water and reaches the seismic receiver, which records its presence.

The wave field continues its travel toward the water surface, where it is reflected downward. This reflected wave field or "ghost" is also propagated through the water and reaches the receivers, where it is again recorded.

This reverberation of the seismic wave field in the water obscures the seismic data by amplifying certain frequencies and attenuating others, which makes it difficult to analyse the underlying terrestrial formations.

It has already been proposed, for suppressing the ghosts, to acquire seismic data at two different depths. This technique is called "over-under" (for "over cable-under cable").

Document U.S. Pat. No. 2,757,356 describes a process for recording reflection seismic data, in which two seismographic receivers are arranged at two distinct depths in the water so that the reverberations in the water column they receive are phase-shifted by 180 degrees. By combining the output of the receivers, the document suggests that the reverberations will be cancelled out.

Document US 2006/0176775 proposes a device making it possible to connect a streamer located at a first depth to a streamer located at a second depth so as to ensure the vertical alignment of the streamers at the first and second depths.

However, such a solution is expensive and difficult to implement since it requires the use of auxiliary devices on the streamers.

An objective of the invention is to propose a process for marine seismic exploration that is more economical and easier to implement than the process described in document US 2006/0176775.

Another objective of this invention is to provide a process for seismic processing making it possible to eliminate ghosts with a result at least equivalent to that obtained with the system described in document US 2006/0176775.

DESCRIPTION OF THE INVENTION

According to a first aspect, the invention relates to a process for marine seismic exploration at least two different depths by means of streamers, each including a set of hydrophones, the acquisition of data at the different depths being performed in a single exploration region, wherein, in said exploration region, the position of the streamers and the hydrophones when acquiring seismic data at a first depth is independent of the position of the streamers and hydrophones when acquiring seismic data at a second depth.

By "exploration region", it is meant the area delimited by the streamers when acquiring seismic signals at one of the depths, to which a margin of error is added.

The error margin corresponds to a surface surrounding the area delimited by the streamers when acquiring seismic signals at one of the depths. This error margin is dependent in particular on a quality factor desired by the user, as will be explained in greater detail hereinafter.

The seismic exploration process proposed above has the advantage of being more economical than the process described in document US 2006/0176775.

Indeed, by removing the constraints on the alignment of the streamers at the first and second depths, the exploration process described above makes it possible to dispense with the auxiliary devices proposed in document US 2006/0176775.

In an alternative, the acquisition of seismic data is performed in two steps which are phase-shifted in time. In other words, in the case of an acquisition of seismic data at two depths, the acquisition of seismic data at the first depth is performed at a first step, and the acquisition of seismic data at the second depth is performed in a second step.

This alternative makes it possible to cover a broader exploration area and/or to improve the quality of the output traces obtained by comparison with the seismic exploration process described in document US 2006/0176775.

Indeed, the maximum number of streamers used for seismic prospecting is dependent on the towing power of the vessel.

Thus, in the case of an "over-under" seismic exploration, as described in document US 2006/0176775, the number of streamers used at each depth is equal to half the maximum number of streamers that the vessel can tow.

Conversely, by performing the acquisition in two steps as proposed, it is possible to use, for each of the two depths, a number of streamers equal to the maximum number of streamers that the vessel can tow.

According to another aspect, the invention relates to a process for processing marine seismic data acquired at least two different depths by means of streamers each including a set of hydrophones, wherein the acquisition of data at the different depths is performed in a single exploration region, so as to obtain output traces in which parasitic surface reflections have been suppressed, wherein output traces are obtained by linear combinations of the seismic data in the frequency domain, with the coefficients of said linear combination being calculated, for each frequency, on the basis of seismic data acquisition positions and depths at which the output traces are to be obtained, and on the basis of the propagation equation of the waves in the water layer located above the hydrophones.

This seismic processing process is suitable for seismic data acquired at two depths and of which the recording positions at the first and second depths are independent.

By "position", we mean coordinates in two dimensions (x, y) in a plane perpendicular to the vertical line on which the measurement of the depth is performed.

DESCRIPTION OF THE FIGURES

Other features and advantages of the seismic exploration and processing processes will become clearer from the following description, which is purely illustrative and non-limiting and must be read in reference to the appended drawings, in which.

DESCRIPTION

We will now describe the seismic exploration and processing processes presented above in greater detail.

The exploration process involves the acquisition of seismic data at two depths. This seismic data is recorded by an acquisition device in which a single source position gives way to recordings of seismic signals by means of two sets of streamers placed at different depths. For each depth, it is possible to record seismic data at different times and with different sources, but the exploration regions (area covered by a set of streamers at the time of acquisition to which an error margin is added, of which the value depends on the frequency studied) must be the same at the first and second depths. Within this exploration region, the positions of the streamers and the hydrophones at the first and second depths can be different. Thus, the positions of the streamers and the hydrophones when acquiring data at the first depth are independent from the positions of the streamers and hydrophones when acquiring data at the second depth. Once the acquisition of seismic data at the first and second depths has been performed, a processing process described below achieves the suppression of ghosts.

Figure 1:
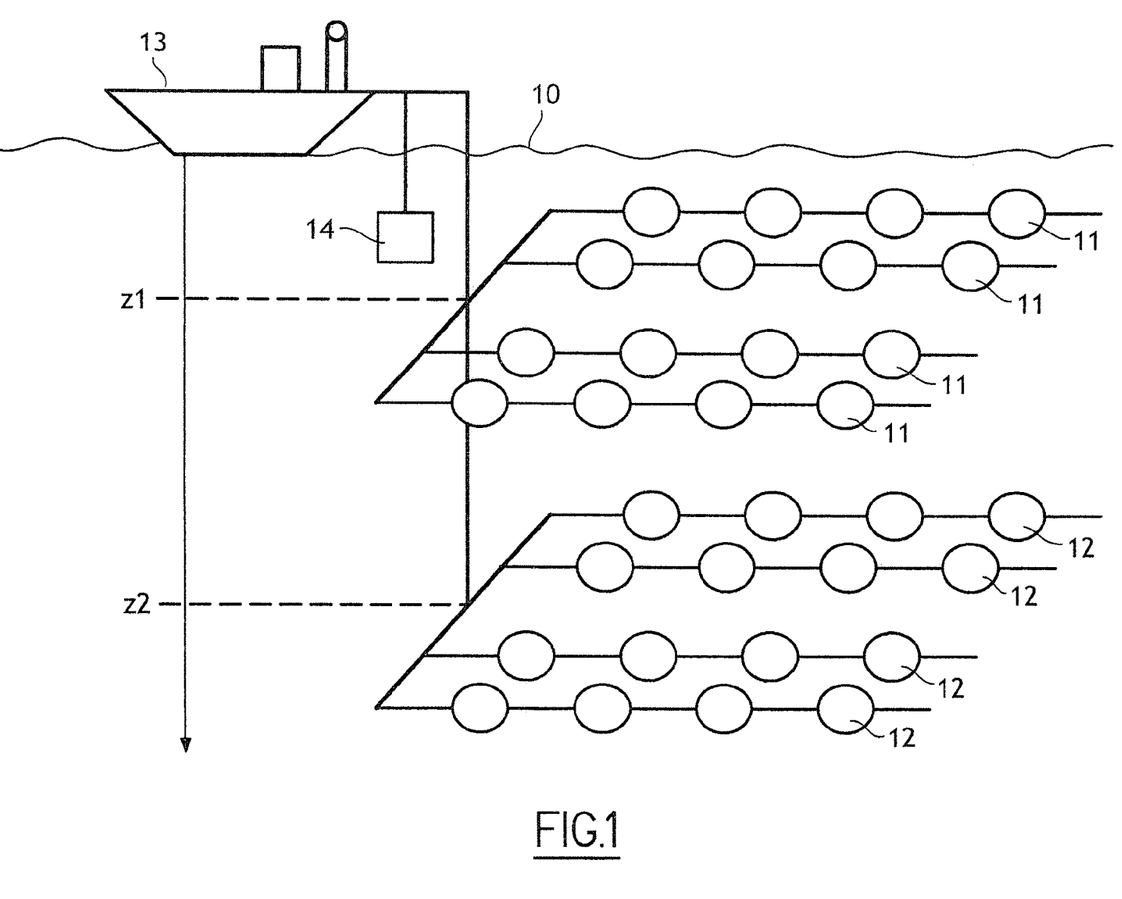
FIGS. 1 and 2 are diagrammatic illustrations of the acquisition of seismic data (or input traces)

FIG. 1 diagrammatically shows a step of acquiring marine seismic data. It shows in particular a body of water 1 extending over a sea floor, with a seismic vessel 13 on the water surface 10.

The vessel 13 tows one or more seismic source(s) 14 intended to transmit an acoustic wave into the water. The source 14 can be a compressed air gun, a marine vibrator or other source types known to a person skilled in the art.

The vessel 13 also tows a first set of streamers located at a first depth z1 (for example 9 meters) and a second set of streamers located at a second depth z2 (for example 18 meters).

Each streamer includes a plurality of seismic receivers or hydrophones 11, 12 intended to record the acoustic signals transmitted by the source after their successive reflections on the interfaces between geological layers—called reflectors.

Figure 2:
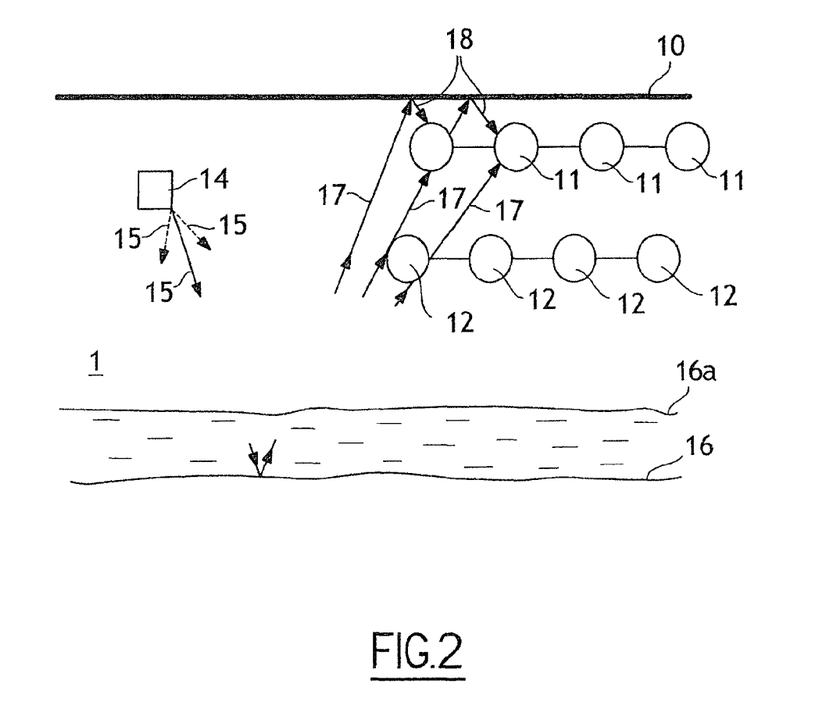

The acquisition device works as follows (see FIG. 2). The seismic vibration transmitted by the seismic source 14 travels downwardly along a plurality of paths 15 and is reflected at the interfaces between materials with different acoustic impedances such as the interface 16—the sea floor is referenced 16a.

A reflected wave field 17 travels upwardly to the water surface 10 and is recorded by the hydrophones 12 at the second depth, and by the hydrophones 11 at the first depth.

The hydrophones 11, 12 at the first and second depths z1, z2 record the reflected waves of the upgoing wave field 17.

However, and as indicated in the "Prior art" part, the recordings are affected by undesirable reflections: a downgoing wave field 18 due to the reflection of waves at the water surface 10 is superimposed with the upgoing wave field 17 bearing the information on the configuration of the geological layers.

The recordings therefore comprise peaks corresponding to surface reflections, which are undesirable reflections. The seismic processing process described below makes it possible to eliminate these undesirable reflections.

Theory on the Processing Process

Below, t denotes time and f denotes frequency.

We will consider a set {E} of n hydrophone input traces corresponding to one or more shotpoints at the same position $(X_s, Y_s)$, the coordinates (x, y, z) of each hydrophone being known, as well as σ(f) corresponding to the signature of the source convoluted by the signature of the hydrophone and recording equipment.

It is therefore desirable to reconstitute the output traces $U_0(x, y, t)$ of the upgoing wave field for the m surface positions of a set {R}, knowing that the Fourier transforms $FK_xK_y$ of the wave field at a depth z are related to that of $U_0$ by the following relation derived from the wave propagation equation in a medium at constant speed c (i.e. water):

$$H_z(f, k_x, k_y) = 2\iota \sin(2\pi z \sqrt{(f/c)^2 - k_x^2 - k_y^2})\ U_0(f, k_x, k_y)$$
$$= G_z(f, k_x, k_y) U_0(f, k_x, k_y)$$

We thus defined the ghost in the frequency domain and the wave numbers by $$G_z(f, k_x, k_y) = 2\iota \sin(2\pi z \sqrt{(f/c)^2 - k_x^2 - k_y^2}).$$

For a given frequency f, the upgoing wave field $U_0$ extracted from the recorded data is given by the relation:

$$\Lambda = C_{U_0 H}(C_H + C_N)^{-1}$$

$$\hat{U}_0 = \Lambda H_z$$

with:
Λ: matrix of coefficients of a linear combination calculated for each frequency
$H_z$: set of seismic data acquired regardless of the depth.

The covariance matrix of $\hat{U}_0$, of which the diagonal elements represent the level of noise present in the reconstituted data is $$C_{\hat{U}_0} = C_{U_0} - \Lambda C^*_{U_0 H}$$

with:
$C_{U_0 H}$: covariance matrix (m, n) of $U_0$ at the reconstruction positions with the data at the recorded positions,
$C_H$: covariance matrix (n, n) of the "ghost" at the recorded positions,
$C_N$: covariance matrix (n, n) of the recorded noise levels,
$C_{U_0}$: covariance matrix (m, m) of $U_0$ at the reconstruction positions, and
$C^*_{U_0 H}$ is the conjugated transpose (or Hermitian transpose) of the matrix $C_{U_0 H}$.

The matrix $C_N$ contains only diagonal terms (propagation of the noises is not to be modelled), which are the estimated power of the noise at the frequency considered for hydrophones.

This matrix $C_N$ can be obtained either by measurements of the noise (recording without energy source), or by using mathematical propagation models of the swell vs. depth as described in the publication of Torgeir Moan, published in the book "*Dynamic Loading and Design of Structures*" of Andreas J. Kappos, on page 180. If nothing is known about the noise, it is possible to set the diagonal elements at zero.

It is nevertheless necessary to add, to the diagonal elements of $C_N$, a so-called pre-whitening term, because at zero frequency (i.e. continuous), the hydrophones cannot have recorded information and the system to be solved becomes singular.

Once the input traces have been recorded, a processing operation makes it possible to eliminate the ghosts.

Figure 7:
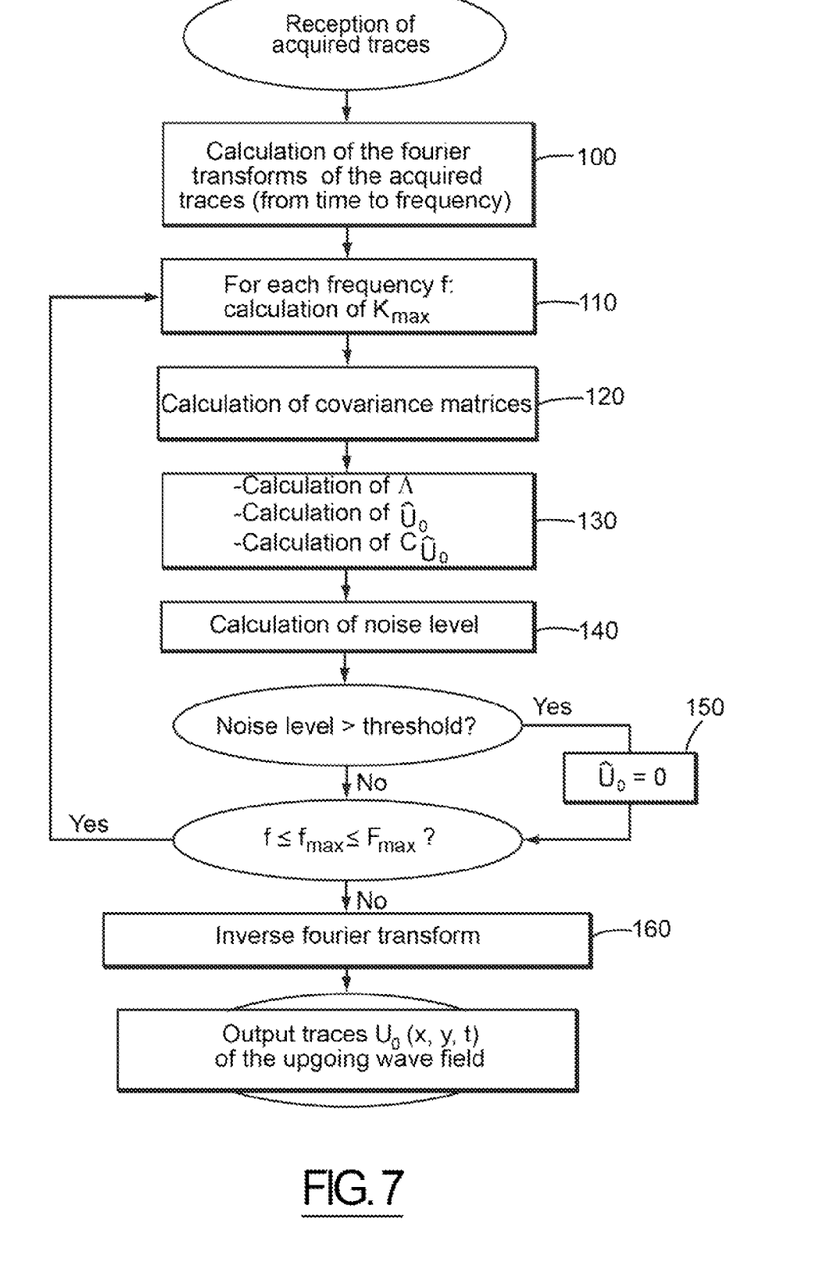
FIG. 7 is a flow chart of the seismic processing process.

In an embodiment, the processing includes a step 100 consisting of calculating the Fourier transforms (from the time domain to the frequency domain) of the input traces recorded by the hydrophones.

Then, for all of the frequencies f below or equal to a threshold frequency ($f_{max}$ or $F_{max}$), the following are calculated:
  $K_{max}$, knowing that $K_{max} = f/c$ (step 110), where $K_{max}$ represents the maximum possible wave number for the frequency f considered,
  the covariance matrices $C_H$, $C_{U_0 H}$, $C_N$ (step 120),
  Λ, $\hat{U}_0$ as well as the diagonal elements of $C_{00}$ (step 130),
  the noise level (step 140): if this calculated noise level is higher than a threshold noise value, the value of the wave field $\hat{U}_0$ estimated at the frequency f (step 150) is set at zero.

When the frequency f becomes greater than the threshold frequency ($f_{max}$ or $F_{max}$), the Fourier transform that is the inverse of the output trace Fourier transforms is calculated.

The set of data is constituted by all of the input traces of a single source position. The positions to be reconstituted are those of the hydrophones of the upper streamer.

The Nyquist sampling theorem enables the threshold frequency to be calculated. By virtue of the sampling theorem (Nyquist), there is no loss of information for wavelengths above half the distance between two adjacent streamers of the plurality of streamers. From this constraint, it is possible to calculate the threshold frequency $F_{max}$ not to be exceeded.

The relation $\lambda = V_{water}/f$ between the wavelength and the frequency makes it possible to characterise the wavelengths present at a given frequency. For a frequency f, we therefore have $K_{max}(f) = f/V_{water}$ (where $V_{water}$ represents the propagation speed of the waves in the water).

It is possible to further reduce the angles of incidence of $U_0$ by noting that the reflected waves cannot have an incidence greater than the critical angle defined by $$\sin(\theta_{max}) = \frac{V_{water}}{V_{ground}}.$$

It is advantageously possible to choose a threshold frequency $f_{max}$ set by the user and below the Nyquist threshold frequency $F_{max}$.

Indeed, in general it is sought only to fill the hydrophones of the upper streamers at low frequencies. It is therefore sufficient to interrupt the process at a certain threshold frequency given by the acquisition characteristics.

In this case, for any frequency f greater than $f_{max}$, the output traces are calculated on the basis of the input traces acquired by the hydrophones of the upper streamers (i.e. the closest to the water surface) to which an inverse filter (de-signature) is applied.

This makes it possible to avoid limiting the implementation of the process described above the frequencies desired by the user.

Indeed, for high frequencies, the conventional inverse filtering processes on the basis of seismic data acquired at a single depth make it possible to obtain good results (for high frequencies) and are generally less costly in terms of computer resources and processing time than the over-under processes.

It is possible that the system to be solved for a complete shotpoint presents information processing problems. It is advantageously possible to cut it into a plurality of smaller systems, taking the precaution of including all hydrophones at a distance of less than $Z_{max} \tan(\theta_{max})$ in a considered vicinity: i.e. including all of the paths contributing to the vicinity.

The step of calculating covariance matrices is then performed as follows, with $\xi = \sqrt{(f/c)^2 - k_x^2 - k_y^2}$.

Let i, j be two indices corresponding to two positions of {R} (therefore on the surface). The (horizontal) distance between these two points is denoted r(i, j). The element (i, j) of the covariance matrix $C_{U_0}$ is given by ($J_0$ and $J_1$ are the usual Bessel functions):

$$C_{U_0}(i, j) = E_{\{U_i^0 \overline{U_j^0}\}}$$
$$= \frac{1}{(2\pi)^2} \int \int e^{2i\pi(k_x(x_i - x_j) + k_x(y_i - y_j))} dk_x dk_y$$
$$= \frac{K_{max}}{4\pi^2 r(i, j)} J_1(2\pi K_{max} r(i, j))$$

Let p, q be two indices corresponding to two positions of {H} (therefore under the surface). The horizontal distance between these two points is denoted r(p, q). The element (p, q) of the covariance matrix $C_H$ is given by:

$$C_H(p, q) = E_{\{H_p \overline{H_q}\}}$$

-continued $$= \frac{1}{(2\pi)^2} \int\int \sigma_p \sigma_q G_{z_p} \overline{G}_{z_q} e^{2i\pi(k_x(x_p-x_q)+k_y(y_p-y_q))} dk_x dk_y$$

$$= \frac{1}{\pi} \sigma_p \overline{\sigma_q} \int_0^{K_n\sigma} (\cos(2\pi(z_p - z_q)\xi) - \cos(2\pi(z_p + z_q)\xi)) J_0(2\pi k r(p, q)) k dk$$

Let i, p be two indices corresponding to a position of {R}. The horizontal distance between these two points is denoted r(i, p). The element (i, p) of the covariance matrix $C_{U0H}$ is given by:

$$C_{U_0^H}(i, p) = E(U_i^0 \overline{H_p})$$

$$= \frac{1}{(2\pi)^2} \int\int \overline{\sigma_p G_{z_p}} e^{2i\pi(k_x(x_i-x_p)+k_y(y_i-y_p))} dk_x dk_y$$

$$= \frac{-i}{\pi} \overline{\sigma_p} \int_0^{K_n\sigma} \sin(2\pi z_p \xi) J_0(2\pi k r(i, p)) k dk$$

where σ represents the signature of the seismic source, and G represents the ghost due to the parasitic surface reflections.

The last two integrals do not have an analytic solution but can be calculated numerically by a Gaussian quadrature algorithm, or by replacing the trigonometric functions with a simple limited development and by analytically solving these two integrals.

Figure 5:
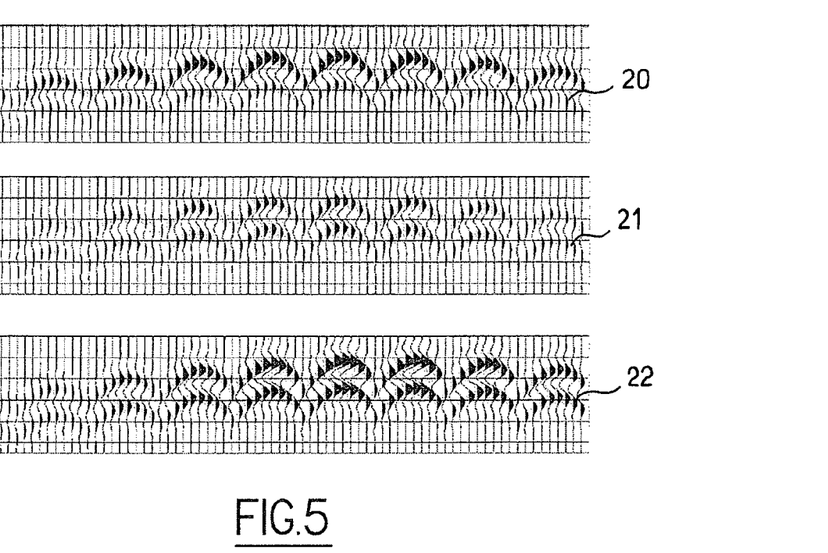
FIG. 5 shows seismic data acquired at depths of 9 metres ($H_{9m}$) and 18 metres ($H_{018m}$), as well as an upgoing wave field $U_0$ calculated on the basis of this seismic data (input traces)

FIG. 5 is an example of the result showing the upgoing wave field $U_0$ 20 calculated on the basis of:

input traces 21 acquired at a depth of 9 meters ($H_{9m}$) and input traces 22 acquired at a depth of 18 meters ($H_{18m}$).

The synthetic data shown in FIG. 5 corresponds to a diffracting point located 400 meters below the water surface and recorded on two hydrophone grids 23, 24 located respectively at 9 meters and at 18 meters.

By "hydrophone grid", in the context of this invention, it is meant the set of positions of the hydrophones at a depth.

Figure 3:
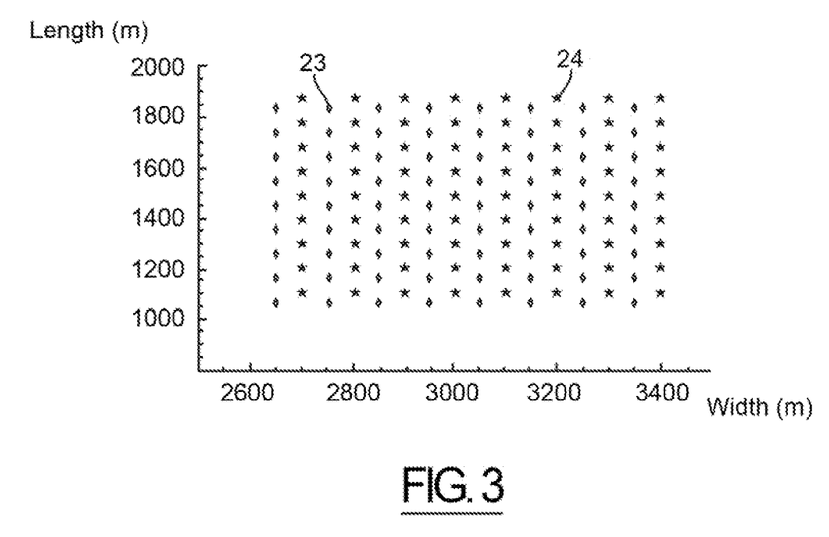
FIG. 3 is a top view of hydrophones arranged at two depths.

Each hydrophone grid 23, 24 has a length of 100 meters and a width of 50 meters. The two hydrophone grids 23, 24 are interlaced, as shown in FIG. 3, where the hydrophones 23 of the grid located at a depth of 9 meters are shown with stars, and where the hydrophones 24 of the grid located at a depth of 18 metres are shown with diamonds.

It is possible to qualify the reconstitution of the upgoing wave field $U_0$ by the quality factor $$\rho = \sqrt{\frac{tr(C_{U0} - C_{U0})}{tr(C_{U0})}}$$

Figure 4:
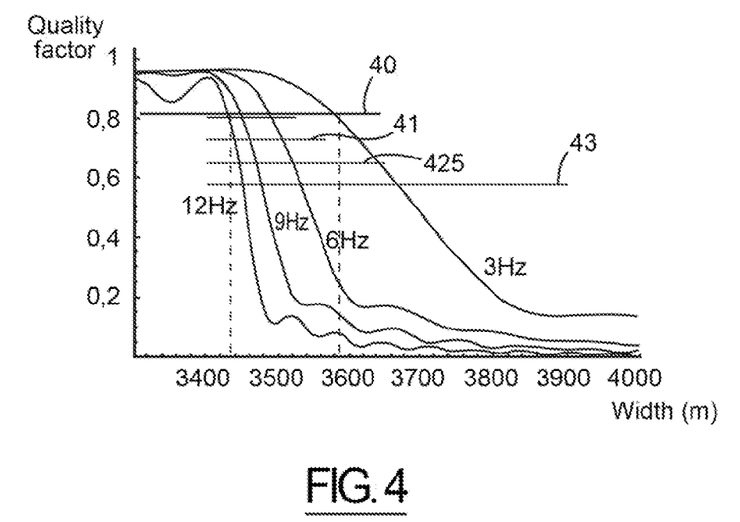
FIG. 4 is a diagrammatic representation of a quality factor for various frequencies according to the position for which an upgoing wave field $U_0$ has been calculated with respect to the grids.

FIG. 4 is a diagrammatic representation of this quality factor for frequencies of 3 Hz, 6 Hz, 9 Hz and 12 Hz according to the position for which the upgoing wave field $U_0$ has been calculated with respect to the grids.

The horizontal lines 40, 41, 42, 43 make it possible to compare the degradation of the spatial extrapolation of the wave field with respect to the wavelength of the frequency considered.

It is noted that the quality factor is close to 1 when staying inside the two grids, then decreases more quickly when moving away from the two grids, and that the frequencies considered increase.

The error margin will be determined according to the frequency considered and the quality factor desired by the user. Thus, if the user wants a quality factor equal to 0.8 (horizontal line 40), then the width of the error margin will be 20 meters at the frequency f=12 Hz, and 200 meters at the frequency f=3 Hz.

Figure 6:
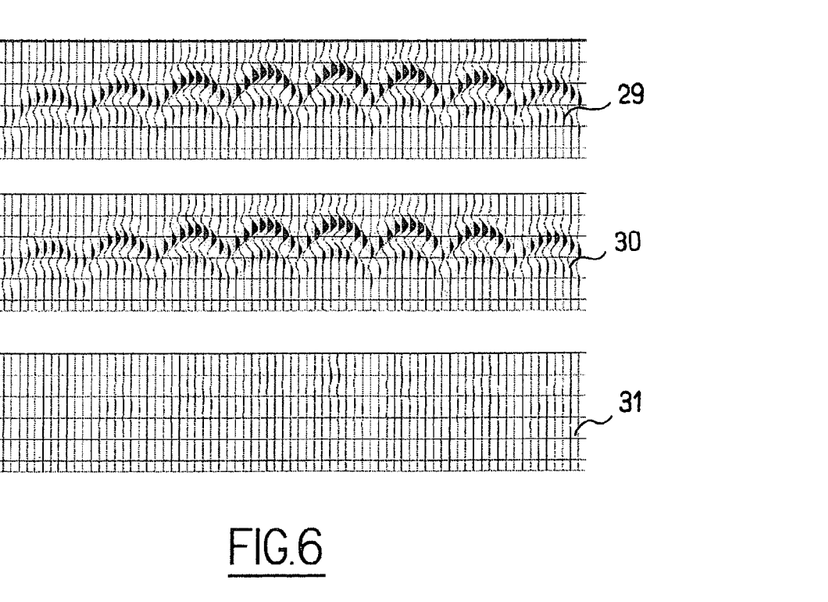
FIG. 6 is a graphic representation showing the real wave field $U_0$, the calculated field $\hat{U}_0$ as well as the difference between the real wave field and the estimated wave field $\hat{U}_0 - U_0$.

Within the grids, the wave field is perfectly reconstituted, as shown in FIG. 6, which represents the real wave field 29, the calculated wave field 30 and the difference 31 between the calculated wave field and the real wave field.

The process described above can be adapted to a two-dimensional processing operation (x, z), i.e. by estimating that the geology does not vary laterally. Then, the streamers are considered by vertical pairs. It is sufficient to have $k_y=0$ in the covariance matrix formulas described above, then to calculate the expectations by an integration $\iint_{-Kmax(f)}^{Kmax(f)} \ldots dk$. The technique using the limited development of the integrated factor makes it possible to find an analytical approximation of the covariances.

The processing process described above will preferably be implemented by means of a processing device including means for implementing the steps of the processing process, such as a PC-type computer comprising a memory and a processing on which a computer program is run.

This computer program will include in particular one or more algorithms making it possible to carry out the steps of the process described above. Of course, a final objective concerns a computer program as such stored on a medium.

The processes described above make it possible to limit the constraints on the alignment of the streamers at the first and second depths in an "over-under" acquisition.

In particular:
it is not necessary to precisely align the streamers at the first and second depths;
the acquisition at the first and second depths can be performed in two steps; in other words, it is possible to perform an acquisition at the first depth in a first step, and an acquisition at the second depth in a second step.

The invention claimed is:

1. Process for marine seismic exploration at at least two different depths by means of streamers, each including a set of hydrophones, the acquisition of data at the different depths being performed in a single exploration region, wherein, in said exploration region, the position of the streamers and the hydrophones when acquiring seismic data at a first depth is independent of the position of the streamers and hydrophones when acquiring seismic data at a second depth, the process further including the processing of seismic data acquired by hydrophones at the two depths in order to obtain output traces in which parasitic surface reflections have been suppressed, with the output traces being obtained by linear combinations of the seismic data in the frequency domain, with the coefficients of said linear combination being calculated, for each frequency, on the basis of seismic data acquisition positions and depths at which the output traces are to be obtained, and on the basis of the propagation equation of the waves in the water layer located above the hydrophones.

2. Exploration process according to claim 1, in which the acquisition of data at the first depth is performed in a first step, and the acquisition of data at the second depth is performed in a second step.

3. Exploration process according to claim 1, in which the output traces correspond to an upgoing wave field calculated for a depth equal to the water surface.

4. Exploration process according to claim 1, wherein the positions at which the output traces are to be obtained correspond to the positions for acquisition of seismic data at the first depth.

5. Exploration process according to claim 1, further including a step of calculating a level of noise in the output traces.

6. Exploration process according to claim 5, wherein, if the noise level calculated for an output trace is greater than a threshold noise, the output trace is set to zero.

7. Exploration process according to claim 6, wherein the noise level is minimized by taking into account, in the step of calculating the linear combination coefficients, signatures of the seismic source used when acquiring seismic data, and characteristics of the hydrophones.

8. Exploration process according to claim 1 wherein for any frequency f higher than a threshold frequency $f_{max}$ predetermined by a user, the output traces are obtained on the basis of seismic data, acquired by the hydrophones located at the depth closest to the water surface, to which an inverse filter is applied.

9. Process for processing marine seismic data acquired at at least two different depths by means of streamers each including a set of hydrophones, wherein the acquisition of data at the different depths is performed in a single exploration region, so as to obtain output traces in which parasitic surface reflections have been suppressed, wherein the output traces are obtained by linear combinations of the seismic data in the frequency domain, with the coefficients of said linear combination being calculated, for each frequency, on the basis of seismic data acquisition positions and depths at which the output traces are to be obtained, and on the basis of the propagation equation of the waves in the water layer located above the hydrophones.

10. Processing process according to claim 9, in which the output traces correspond to an upgoing wave field calculated for a depth equal to the water surface.

11. Processing process according to claim 9, in which the positions at which the output traces are to be obtained correspond to the positions for acquiring seismic data at the first depth.

12. Processing process according to claim 9, also including a step of calculating a level of noise in the output traces.

13. Processing process according to claim 12, in which, if the noise level calculated for an output trace is higher than a threshold noise level, the output trace is set to zero.

14. Processing process according to claim 9, wherein the noise level is minimized by taking into account signatures of the seismic source used when acquiring seismic data, and characteristics of the hydrophones in the step of calculating the linear combination coefficients.

15. Processing process according to claim 10, wherein, for any frequency f higher than a threshold frequency $f_{max}$ predetermined by a user, the output traces are obtained on the basis of seismic data, acquired by the hydrophones located at the depth closest to the water surface, to which an inverse filter is applied.

* * * * *

UNITED STATES PATENT AND TRADEMARK OFFICE
CERTIFICATE OF CORRECTION

PATENT NO.       : 8,553,491 B2                                   Page 1 of 1
APPLICATION NO.  : 12/154767
DATED            : October 8, 2013
INVENTOR(S)      : Gratacos It is certified that error appears in the above-identified patent and that said Letters Patent is hereby corrected as shown below:

On the Title Page, in Item (57), under "ABSTRACT", in Column 2, Line 2, delete "at least" and insert -- at at least --, therefor.

In the Specification:

In Column 2, Line 24, delete "at least" and insert -- at at least --, therefor.

In Column 3, Line 2, delete "at least" and insert -- at at least --, therefor.

In Column 5, Line 49, delete "$C_{00}$" and insert -- $C_{\hat{U}_0}$ --, therefor.

In Column 6, Line 47, delete "$C_{U0}$" and insert -- $C_{U_0}$ --, therefor.

In Column 7, Line 11, delete "$C_{U0H}$" and insert -- $C_{U_0 H}$ --, therefor.

In Column 7, Lines 51-53, delete "$\rho = \sqrt{\dfrac{tr(C_{U0} - C_{U0})}{tr(C_{U0})}}$" and insert -- $\rho = \sqrt{\dfrac{tr(C_{U_0} - C_{\hat{U}_0})}{tr(C_{U_0})}}$ --, therefor.

In the Claims:

In Column 9, Line 15, in Claim 8, delete "claim 1" and insert -- claim 1, --, therefor.

Signed and Sealed this
Seventeenth Day of December, 2013

Margaret A. Focarino
*Commissioner for Patents of the United States Patent and Trademark Office*